United States Patent Office 3,717,064
Patented Feb. 20, 1973

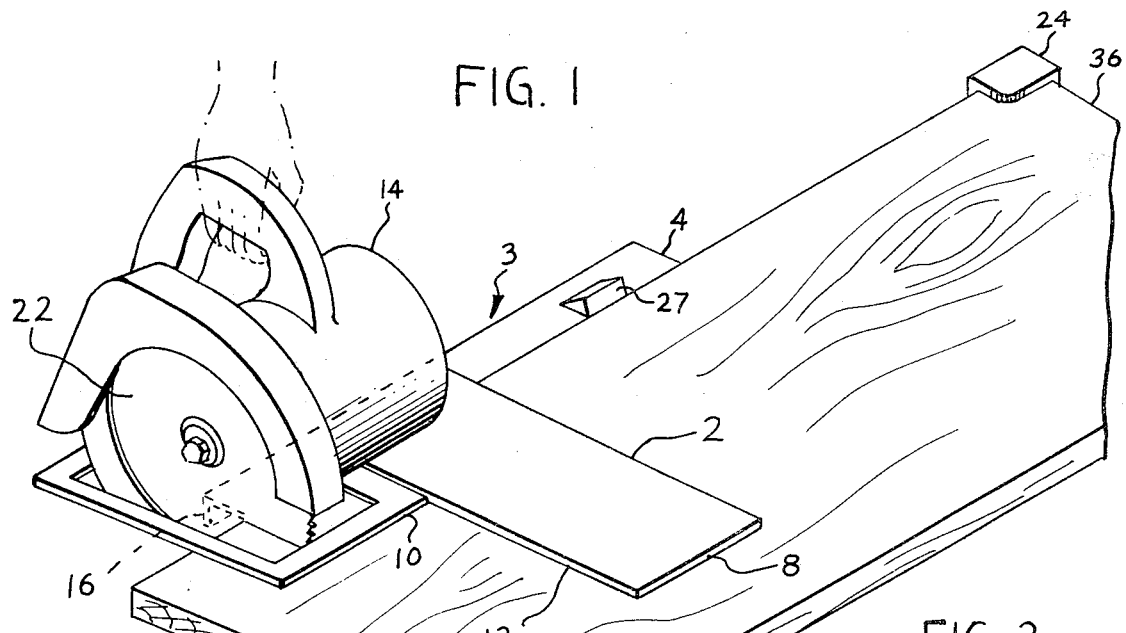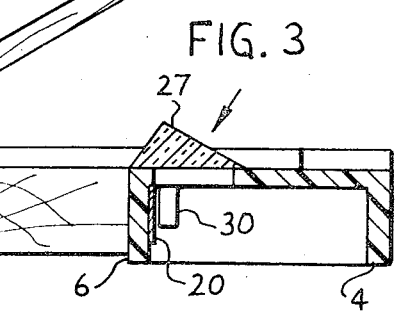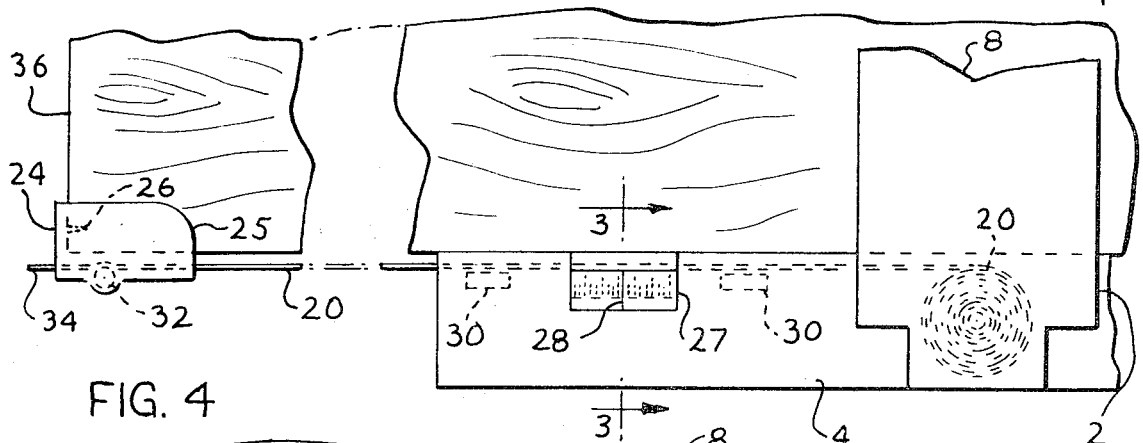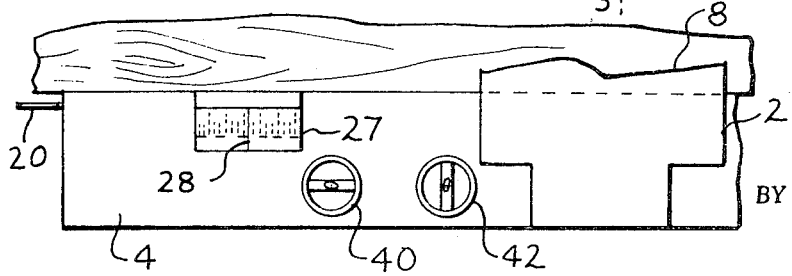

3,717,064
GUIDES FOR HAND POWER SAWS
Naaman Shelton, 16601 Taylorsville Road,
Fisherville, Ky. 40208
Filed Aug. 17, 1970, Ser. No. 64,505
Int. Cl. B27b 9/04, 27/06
U.S. Cl. 83—761                    5 Claims

ABSTRACT OF THE DISCLOSURE

One of the disadvantages of electric hand saws is the difficulty of cutting perfectly straight lines with them. Saw guides are available but they are difficult to hold and they must be carefully spaced from the line being cut. A guide is known which can be readily held, and which has an edge adapted to be aligned with the line being cut. However it is still necessary separately to measure and mark off a cutting line. This invention simplifies this measuring operation by the provision of a saw guide which includes a measuring means.

BACKGROUND OF THE INVENTION

This invention relates to portable saw guides of the type described in copending application Ser. No. 888,539, filed Dec. 29, 1969.

Usually one of the first power tools the homeowner acquires for do-it-yourself jobs is an electric hand saw. Table saws contain fast moving circular blades and are best for sawing straight lines. Nevertheless normally only the serious amateur craftsman buys a table saw. Electric saws most used are hand-held circular saws and sabre saws.

One of the disadvantages of electric hand saws is the difficulty of cutting perfectly straight lines with them. Edge guide attachments for ripping are available for hand saws. However if a line is to be cut quite a distance from the edge, or if the edge of the board is not straight, such edge guides are unsatisfactory. Portable saw guides are also available but they are not easily held in place. Hence generally the practice is to clamp a strip of wood across the board. This practice is time consuming, and there is a possibility of error since the strip must be carefully spaced from the line being cut, taking the base plate of the saw into consideration.

By the invention described in Ser. No. 888,539 an electric hand saw guide is provided which can be readily held so that it has little tendency to slip. At one end the guide overlaps the edge or side of the board, and at its other end thumb lugs are mounted on the guide so that it can be pressed down and held tightly against the board. The guide is in the form of a T somewhat similar to a T square, having generally flat strips which can be held on top of the board to provide a straight edge against which the base plate of the saw slides as it is pushed forward.

The saw guide of Ser. No. 888,539 is easy to use, and it overcomes most of the problems encountered when using handheld power saws. However, it is still necessary separately to measure and mark off a cutting line with which the guide will be aligned. The invention herein simplifies this initial measuring opertaion.

SUMMARY OF THE INVENTION

In accordance with the practice of this invention a saw guide such as that described in Ser. No. 888,539, includes measuring means. Measuring means contemplated herein encompasses a flexible tape and indicating means adapted to show directly the distance from the end of the board to the line being cut.

DETAILED DESCRIPTION OF THE INVENTION

Perhaps the only disadvantage of the saw guide described in Ser. No. 888,539 is the fact that separate measurments must first be made. This means that a tape or other ruling device is first used which frequently is misplaced when the board is being cut. Moreover, generally speaking, it is always desirable to work with one piece of equipment rather than several.

This invention will perhaps be best understood by reference to the accompanying drawing, which, of course, is for the purpose of illustration only since modifications will occur to those skilled in the art.

FIG. 1 is an isometric view showing the saw guide-measuring combination of the invention and how it is used.

FIG. 2 is a top plan view showing the measuring means in greater detail.

FIG. 3 is a cross-sectional view of part of the indicating means taken along 3—3 of FIG. 2.

FIG. 4 is a view similar to that of FIG. 2 which shows a different embodiment of the invention.

Referring now to FIG. 1, it can be seen that the saw guide 3 of this invention is in the form of a cutting T. A longitudinal member 2 in the form of a plastic, metal or wooden strip is secured to a transverse member 4 which normally will be fabricated of plastic or wood. Transverse member 4 is secured at a point between its ends to the underside of one end of longitudinal member 2, and the transverse strip has either a downwardly depending body portion or flange 6 sufficiently wide to fit tightly against the board 7 being cut. In other words, body flange 6 so extends downwardly from the plane of member 2 that the guide can rest against a board edge. It will not readily slip off a board if pressure is applied to longitudinal member 2 so as to pull body flange 6 tightly against a board edge. Stated differently, the flange or body portion closer to the free end 8 of the longitudinal member is adapted to rest against the board being sawed. The saw guide 3 hence is used with longitudinal member 2 across a board 7 so that a saw can be slid along the guide with its base plate 10 in abutment with front edge 12 of the saw guide.

An advantage of the saw guide employed herein is the ease with which it can be held in place. The thumb will be pressed against the guide near end 8 and the fingers will be pressed against the board, preferably by hooking the fingers over the edge of the board. In this way the guide can be held tightly in place as the power saw 14 is pushed therealong. If desired thumb lugs can be mounted on longitudinal member 2 to make the guide easier to hold against the board. A series of holes function as thumb lugs if they are preferred to the projections.

One of the drawbacks of cutting by moving a saw along any straight edge is that of spacing the edge from the cutting line. This distance always must be measured accurately or the cut will not be exact. Moreover using some saw guides, it is difficult to align the straight edge parallel to the line being cut. Both of these difficulties are overcome by the apparatus of this invention. As indicated hereinbefore transverse member 4 is preferably made of wood or plastic. The reason for this is that this member 4 is manufactured of a material capable of being sawed. The end of the longitudinal member 2 is joined to transverse member 4 at a distance from an end which exceeds the distance from the saw blade to the edge of the base plate of the saw. When put into use, transverse member 4 is cut by the saw with which the guide will be used. If this is done, the distance from the straight edge 12 to the line being cut will be equal to the distance from the edge of the saw base plate to the saw blade. Consequently transverse member 4 will have an edge 16 which will be an extension of the line being cut. The saw blade will abut edge 16 and slide along this edge and into the wood at the line being sawed.

The object of this invention is to make it easier to measure the distance to the line being cut. As can be seen by reference to FIG. 2, a recoiling flexible measuring tape 20 of plastic or steel is housed in the base of saw guide 3, generally within transverse member 4. The tape is installed within the saw guide so that it can be pulled out the end of transverse member 4 as shown in FIG. 2 along the board to be sawed. The tape will be withdrawn from the end of transverse member 4 away from end 16 which abuts saw blade 22, the device as shown in FIG. 2 being reversed in the case of a left handed guide.

In order to hold the end of tape 20 on the end of board 7 so that a hand will be free to saw, or to mark a line if desired, the tape end is adapted to hook around the corner of the board. In order that this can be accomplished, the tape end has attached thereto an angle strap or other L-shaped member 24. Angle strap 24 as shown is L-shaped. However it is provided with a top plate 25 thereacross to keep the L-shaped member from falling off the corner of board 7. Although not necessary, it is desirable that angle strap 24 carry a pin 26 in such manner that it will bite into, or penetrate, the board end to hold the angle strap securely in place during use.

In addition to measuring tape 20, and fastening means 24 to hold this tape in place, some method of reading the tape must be provided. This is best accomplished by the use of magnifying lens or prism 27 having an indicating line thereon. The indicating means of this invention thus includes the tape fastening means, the lens or prism, and the indicating line. The use of prism 27 will be understood by reference to FIG. 3. This figure shows the side or flange 6 of transverse member 4 against board 7. Measuring tape 20 is held against flange 6 by guide pins 30. As can be seen in FIG. 3, by looking into prism 27 along a sight line indicated by the arrow, the scale on measuring tape 20 can be read. It will be magnified and it will appear to be horizontal as it does in FIG. 2.

It now remains to adjust or set the scale so that the value read by the use of indicator line 28 will correspond to a board measurement. This adjustment entails the use of locking pin 32 which functions as a pressure post or gib-headed key to hold the measuring tape end securely in place. Referring again to FIG. 2, it can be seen that if end 34 of measuring tape 20 has an amount cut off it can nevertheless be held in place by locking pin 32. If the amount of the tape cut off, as measured from the end of board 7, is equal to the measurement from indicator line 28 to end 16 of transverse member 4, indicator 28 will give directly the required measurement. Stated differently, the value which will be read at the indicator line will be the distance from the end 36 of board 7 to the line to be cut at 16.

It is thus apparent that a very useful, practical and manageable saw guide is afforded by this invention. It is necessary in use only to secure end-piece 24 over the corner of the board being cut, and slide transverse member 4 along the board while looking at indicator line 28 along the sight line shown by the arrow in FIG. 3. If the numeral at the indicator line shows, say, 30 inches, a line will be cut 30 inches from edge 36 of board 7. To set the guide initially it is placed along a board and the end is cut off leaving edge 16. An accurate measurement is then made from edge 16 to the indicator line, and the measuring tape end 34 is pulled out until this measurement appears at indicator line 28. End 34 is then locked in place by locking pin 32, and the end of the measuring tape beyond angle member 24 is cut off. The saw guide-measuring means combination is then in adjustment for the saw with which it will be used. It will then be used as explained hereinbefore.

It will be understood that various changes can be made in the device herein without departing from the spirit of the invention. As an example, leveling means, such as tubes or spirit levels 40 and 42, can be mounted on one of the members of the saw guide, preferably transverse member 4 as illustrated in FIG. 4. This modification confers on the guide an additional use, rendering it useful as a leveling device as well as a saw guide. It is understood also that other hooking means are available to permit the end of measuring tape 20 to be secured to board end 36. Thus with pin 26 in place, plate 25 is not as necessary. As another example, other magnifying means can be used in lieu of prism 27. In addition the recoiled portion of tape 20 can be held in any of the various types of housings known in the art. The measuring tape can also be made to recoil by any means known in the art. Such ramifications, hence, are deemed to be within the scope of this invention.

What is claimed is:

1. A guide for a portable hand saw of the type having a base plate and a motor driven blade perpendicular thereto comprising a transverse flat member adapted to rest on the side of a board to be cut, lying along said board transverse to said cut, a longitudinal flat member having one of its ends joined to the transverse member to form a T-shaped guide and adapted to be hand-held across the board being cut so that the board can be cut by moving the base plate of the saw along the longitudinal member, one end of the transverse member being adapted to be cut by the saw so that its edge is on the line being cut, a recoiling flexible measuring tape, a housing for said tape, means holding the housing on the underside of the transverse member in a position such that the measuring tape can be pulled out of the housing in a path along the transverse member end not abutting the saw blade, and such that the tape can be placed along the edge of the board abutting the transverse member, said transverse member having an opening therein above the path of the measuring tape, prism magnifying means mounted over the opening in the transverse member so that the measuring tape therebeneath can be read from above, an indicating line on said prism, the measuring tape having its end removed in an amount of tape equal to the distance from the indicating line to the saw blade so that the value at the indicating line is the distance to the blade.

2. The combination of claim 1 wherein leveling means are mounted on the saw guide permitting it to be used as a leveling device.

3. The combination of claim 1 wherein the fastening means is an angle strap adapted to overlap the board end.

4. The combination of claim 3 wherein the angle strap carries a pin adapted to project into the board end.

5. The combination of claim 3 wherein the angle strap carries a locking pin to secure the tape end to the strap.

References Cited

UNITED STATES PATENTS 3,390,461   7/1968   Anderson _____ 3—7 R
3,008,238   11/1961  Ford _____ 3—89
3,141,628   7/1964   Evans et al. _____ 33—138 X DONALD R. SCHRAN, Primary Examiner U.S. Cl. X.R.

33—75 R, 89